US012153366B2

(12) United States Patent
Ogata et al.

(10) Patent No.: US 12,153,366 B2
(45) Date of Patent: Nov. 26, 2024

(54) RECORDING MATERIAL CONVEYANCE DEVICE AND IMAGE FORMING SYSTEM

(71) Applicant: KONICA MINOLTA, INC., Tokyo (JP)

(72) Inventors: Satoshi Ogata, Hachioji (JP); Masashi Sugano, Machida (JP)

(73) Assignee: KONICA MINOLTA, INC., Tokyo (JP)

( * ) Notice: Subject to any disclaimer, the term of this patent is extended or adjusted under 35 U.S.C. 154(b) by 8 days.

(21) Appl. No.: 18/200,160

(22) Filed: May 22, 2023

(65) Prior Publication Data

US 2023/0408960 A1 Dec. 21, 2023

(30) Foreign Application Priority Data

Jun. 20, 2022 (JP) ................................ 2022-098590

(51) Int. Cl.
*G03G 15/00* (2006.01)

(52) U.S. Cl.
CPC ................................ *G03G 15/5029* (2013.01)

(58) Field of Classification Search
CPC ................................................. G03G 15/5029
See application file for complete search history.

(56) References Cited

U.S. PATENT DOCUMENTS

2020/0210115 A1* 7/2020 Igawa ................ G03G 15/5012
2020/0255239 A1 8/2020 Izumiya et al.

FOREIGN PATENT DOCUMENTS

JP 2020008621 A 1/2020
JP 2020128269 A 8/2020

* cited by examiner

*Primary Examiner* — David H Banh
(74) *Attorney, Agent, or Firm* — Holtz, Holtz & Volek PC

(57) ABSTRACT

A recording material conveyance device that can suppress a decrease in productivity when detecting characteristics of the recording material is provided. A recording material conveyance device includes: a first conveyor that constitutes a conveyance route for a recording material; a second conveyor and a third conveyor that branch off from the first conveyor and constitute the conveyance route for the recording material on a downstream side of a recording material conveyance direction of the first conveyor; a first detector that detects recording material characteristics of the recording material disposed in the first conveyor; a second detector that detects the recording material characteristics disposed in the second conveyor; and a controller that stops detection by the second detector and discharges the recording material that is being detected by the second detector when the first detector detects an abnormality in a detection result of the recording material characteristics.

19 Claims, 6 Drawing Sheets

RECORDING MATERIAL CONVEYANCE DEVICE AND IMAGE FORMING SYSTEM

CROSS-REFERENCE TO RELATED APPLICATIONS

The entire disclosure of Japanese patent Application No. 2022-98590, filed on Jun. 20, 2022, is incorporated herein by reference in its entirety.

BACKGROUND

Technological Field

The present invention relates to a recording material conveyance device and an image forming system including the recording material conveyance device.

Description of the Related Art

In an image forming device, a plurality of types of recording material may be used. In this case, it is possible to improve the quality of formed images by appropriately setting image forming conditions such as the toner transfer voltage and fixing temperature during image formation according to the type and physical properties of the recording material. It is also possible to suppress the occurrence of conveyance failure of the recording material such as a jam, image misalignment, and unevenness of the recording material by conveying the recording material under more appropriate conveyance conditions according to the type and physical properties of the recording material.

As such an image forming device that optimizes the image forming conditions according to the type and physical properties of the recording material, for example, a configuration is proposed in which a detector that detects characteristics such as the type and physical properties of the recording material (hereinafter referred to as recording material characteristics) is disposed in a recording material conveyance route (see Patent Literature 1, for example). An image forming device is proposed with a configuration in which, when the recording material characteristics detected by the detector differ from the setting, images are not formed and the recording material is discharged from the image forming device (see Patent Literature 2, for example).

Related Art Literature

Patent Literature

Patent Literature 1: Japanese Patent Application Laid-Open No. 2020-128269

Patent Literature 2: Japanese Patent Application Laid-Open No. 2020-8621

SUMMARY

However, in the image forming device mentioned above, in order to improve detection accuracy when detecting the recording material characteristics, conveyance of the recording material is stopped or the recording material is conveyed at a low speed. However, if the detector is detecting the recording material characteristics of a preceding recording material, even if another detector detects an abnormality in the recording material characteristics of a succeeding recording material, the preceding recording material stays in the conveyance route. Therefore, the succeeding recording material cannot be discharged from the conveyance route, and a new recording material cannot be conveyed accordingly, leading to a decrease in productivity of the image forming device.

To solve the problem described above, the present invention provides a recording material conveyance device and an image forming system capable of suppressing a decrease in productivity when detecting the characteristics of the recording material.

To achieve at least one of the above-mentioned objects, a recording material conveyance device that reflects one aspect of the present invention includes: a first conveyor that constitutes a conveyance route for a recording material; a second conveyor and a third conveyor that branch off from the first conveyor and constitute the conveyance route for the recording material on a downstream side of a recording material conveyance direction of the first conveyor; a first detector that detects recording material characteristics of the recording material disposed in the first conveyor; a second detector that detects the recording material characteristics disposed in the second conveyor; and a controller that stops detection by the second detector and discharges the recording material that is being detected by the second detector when the first detector detects an abnormality in a detection result of the recording material characteristics.

According to embodiments of the present invention, it is possible to provide a recording material conveyance device and an image forming system capable of suppressing a decrease in productivity when detecting the characteristics of the recording material.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Examples of embodiments for carrying out the present invention will be described below, but the present invention is not limited to the following examples.

Note that the description will be given in the following order.

1. First embodiment of recording material conveyance device and image forming system 2. Second embodiment of recording material conveyance device and image forming system

1. Embodiment of Recording Material Conveyance Device and Image Forming System FIG. 1 is a schematic configuration diagram of an image forming system including a recording material conveyance device of the present embodiment.

Figure 1:
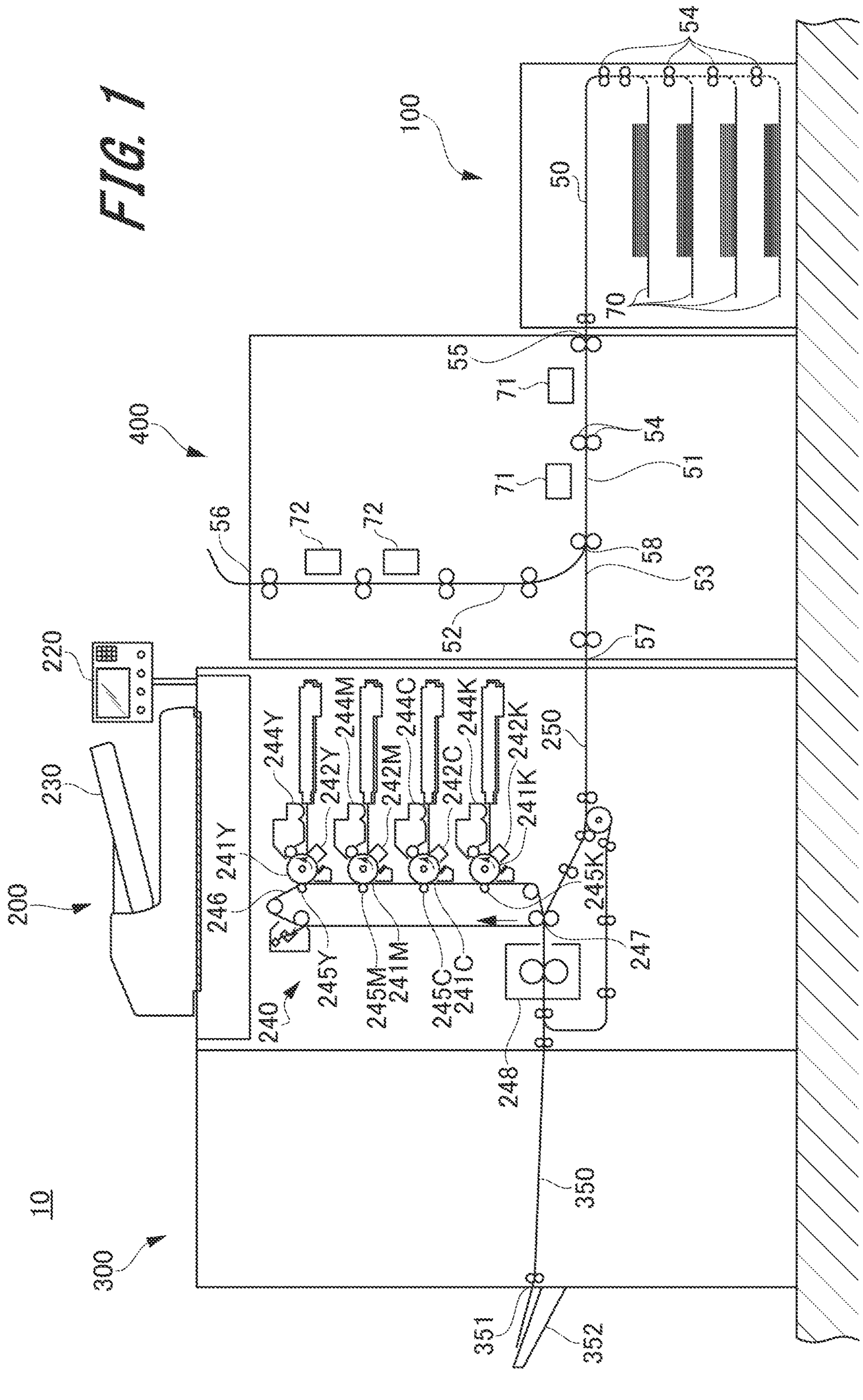
FIG. 1 is a diagram illustrating a schematic configuration of an image forming system of a first embodiment.

The image forming system 10 illustrated in FIG. 1 includes a recording material feeding device 100, a recording material conveyance device 400, an image forming device 200, and a post-processing device 300.

In the image forming system 10, a recording material S loaded within the recording material feeding device 100 is fed to the image forming device 200 via the recording material conveyance device 400. Then, after an image is formed by the image forming device 200 on the recording material S, the recording material S is exported from the image forming device 200 to the post-processing device 300. Then, after predetermined post-processing is performed by the post-processing device 300 on the recording material S that has undergone image forming processing, the recording material S is discharged from the post-processing device 300.

[Recording Material Feeding Device]

The recording material feeding device 100 accommodates recording materials for image formation and feeds the recording material S to the image forming device 200 according to an image forming job in the image forming system 10. As illustrated in FIG. 1, the recording material feeding device 100 includes a conveyor 50, recording material feeders 70 that serve as recording material accommodators, and the like.

The recording material feeders 70 include, for example, a plurality of paper feed trays disposed within the recording material feeding device 100, and the like. The recording material feeders 70 can load a plurality of sheets of recording material S in a stacked state. FIG. 1 illustrates a configuration including four recording material feeders 70 disposed one above the other. Each recording material feeder 70 individually accommodates recording materials of different types and sizes.

The conveyor 50 includes pick up rollers (not shown) that pick up the recording material from each recording material feeder 70, a plurality of conveyance rollers 54 provided along a predetermined recording material conveyance route for conveying the recording material, and so on. Therefore, the conveyance route of the conveyor 50 merges from the plurality of recording material feeders 70 into one conveyance route and then is connected to the recording material conveyance device 400. With this configuration, by driving the conveyance rollers 54, the conveyor 50 conveys the recording material S delivered from the recording material feeder 70 to the recording material conveyance device 400.

[Recording Material Conveyance Device]

The recording material conveyance device 400 includes a delivery inlet 55 where the recording material S is delivered to the recording material conveyance device 400, a first conveyor 51, a second conveyor 52, and a third conveyor 53 that convey the recording material S, a first discharger 56 and an export outlet 57 that export the recording material S, and a first detector 71 and a second detector 72 that serve as detectors that detect characteristics of the recording material S.

[Conveyor]

The recording material conveyance device 400 includes the first conveyor 51, the second conveyor 52, and the third conveyor 53. The first conveyor 51, the second conveyor 52, and the third conveyor 53 include a plurality of conveyance rollers 54 for conveying the recording material S along the conveyance route that constitutes each conveyor, and the like.

The first conveyor 51 constitutes the conveyance route between the delivery inlet 55 where the recording material S is delivered from the recording material feeding device 100 to the recording material conveyance device 400 and a branch 58 where the second conveyor 52 and the third conveyor 53 branch off from the first conveyor 51. That is, the conveyance route for the recording material S branches off into the second conveyor and the third conveyor on the downstream side of the recording material conveyance direction of the first conveyor 51 and the branch 58. With this configuration, the recording material conveyed by the first conveyor 51 is conveyed to either the second conveyor 52 or the third conveyor 53 on the downstream side of the branch 58.

The second conveyor 52 constitutes the conveyance route from the branch 58 to the first discharger 56 provided on top of the recording material conveyance device 400 on the downstream side of the recording material conveyance direction of the first conveyor 51. The recording material S conveyed from the first conveyor 51 through the branch 58 to the second conveyor 52 is discharged from the first discharger 56 to the outside of the recording material conveyance device 400 and the image forming system 10. Therefore, the second conveyor 52 is provided in the recording material conveyance device 400 as the conveyance route for conveying the recording material S without going through an image former 240 of the image forming device 200.

The third conveyor 53 constitutes the conveyance route from the branch 58 to the export outlet 57 on the downstream side of the recording material conveyance direction of the first conveyor 51. The recording material S conveyed from the first conveyor 51 through the branch 58 to the third conveyor 53 is conveyed from the recording material conveyance device 400 to the image forming device 200 through the export outlet 57. Therefore, the third conveyor 53 is provided in the recording material conveyance device 400 as the conveyance route for conveying the recording material S via the image former 240 of the image forming device 200.

Note that the image forming system 10 has a configuration in which the recording material S conveyed by the third conveyor 53 is discharged from a second discharger 351 disposed in the post-processing device 300. When the recording material conveyance device 400 is used alone, the export outlet 57 is used as a discharger (second discharger) for the recording material S conveyed by the third conveyor 53.

The first detector 71 that detects the characteristics of the recording material S is disposed in the first conveyor 51. The second detector 72 that detects the characteristics of the recording material S is disposed in the second conveyor 52.

The recording material characteristics of the recording material S conveyed by the first conveyor 51 are detected by the first detector 71 disposed in the route. Furthermore, the recording material characteristics of the recording material S conveyed from the first conveyor 51 through the branch 58 to the second conveyor 52 are detected by the second detector 72 disposed in the route.

The first detector 71 is disposed at a position from the delivery inlet 55 to the branch 58 along the conveyance route of the first conveyor 51. The second detector 72 is disposed at a position from the branch 58 to the first discharger 56 along the conveyance route of the second conveyor 52.

That is, in the first conveyor 51, the first detector 71 is disposed on the upstream side of the recording material conveyance direction of the branch 58. In the second conveyor 52, the second detector 72 is disposed on the downstream side of the recording material conveyance direction of the branch 58. Only the recording material S conveyed from the first conveyor 51 to the second conveyor 52 is conveyed to the second detector 72. Meanwhile, all the recording materials S conveyed by the first conveyor 51 are conveyed to the first detector 71. Therefore, not only the recording material S conveyed from the first conveyor 51 through the branch 58 to the second conveyor 52 but also the recording material S conveyed from the first conveyor 51 through the branch 58 to the third conveyor 53 is also conveyed.

Therefore, the second detector 72 detects the recording material characteristics of only some recording material S conveyed to the second conveyor 52 through the branch 58 out of the recording material S conveyed to the recording material conveyance device 400. The first detector 71 can detect the recording material characteristics of all the recording materials S conveyed to the recording material conveyance device 400, regardless of the conveyance route of which of the second conveyor 52 or the third conveyor 53 the recording material S is conveyed to after passing through the branch 58.

Note that FIG. 1 illustrates an example in which two media sensors are disposed as each of the first detector 71 and the second detector 72.

The second conveyor 52 preferably has a configuration in which the conveyance distance of the recording material S on the downstream side of the branch 58 is a length that can be accommodated in the recording material feeding device 100, and is a length longer than or equal to the length of the long side of the recording material S that can be conveyed by the recording material conveyance device 400. For example, the second conveyor 52 preferably has a length equal to or longer than the long side of the maximum standard size, except for long paper such as roll paper.

Note that the conveyance distance of the recording material S on the upstream side of the branch 58 of the first conveyor 51 is not particularly limited if the necessary number of first detectors 71 can be disposed and the recording material S can be conveyed stably.

The third conveyor 53 preferably has a configuration in which the conveyance distance of the recording material S from the branch 58 to the export outlet 57 is shorter than the length of the second conveyor 52. The third conveyor 53 preferably has a configuration in which the conveyance distance of the recording material S from the branch 58 to the export outlet 57 is the shortest.

(Detector)

Figure 2:
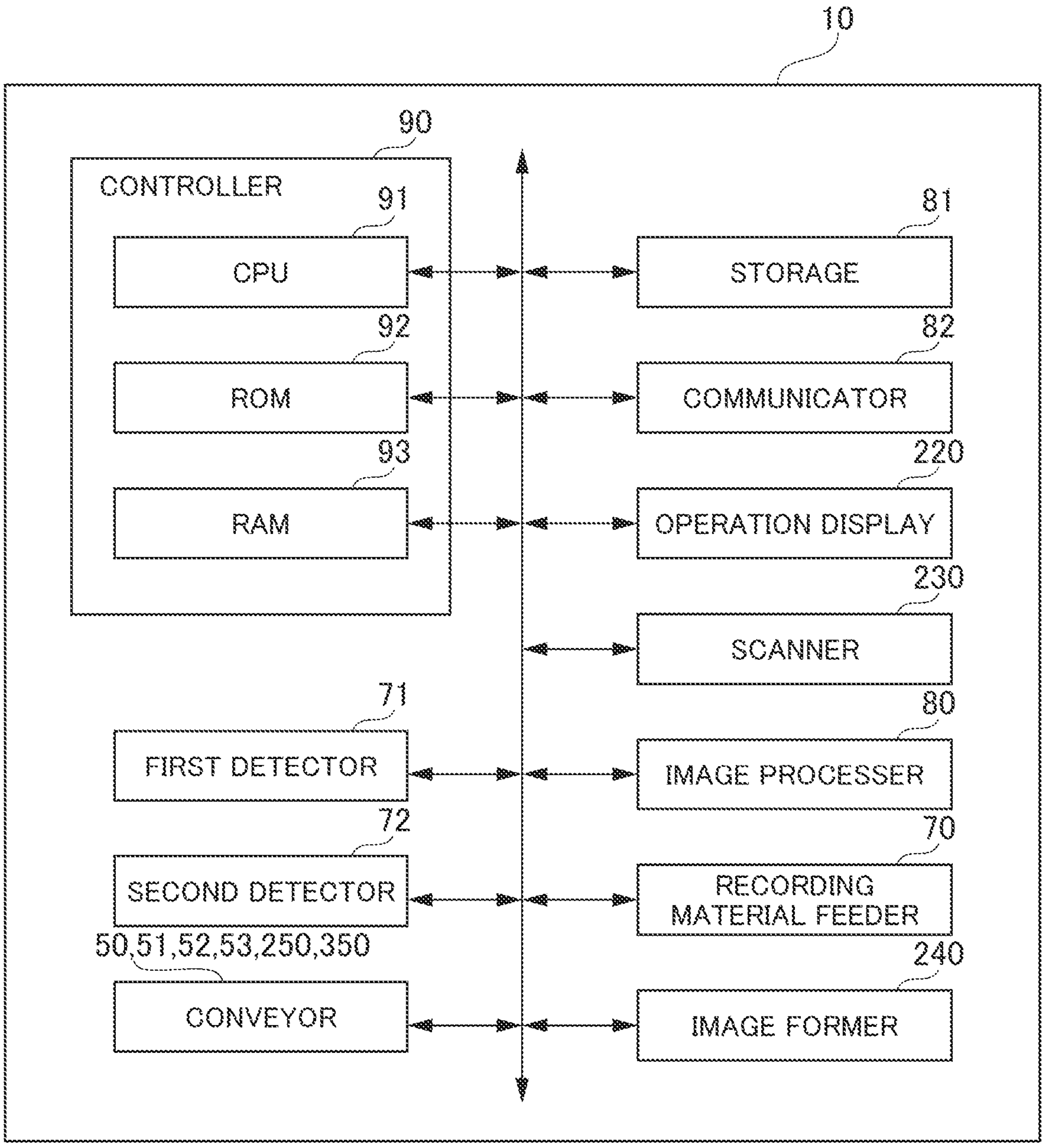
FIG. 2 is a system block diagram of the image forming system of the first embodiment.

The first detector 71 detects the recording material characteristics of the recording material S conveyed to the first conveyor 51 under the control of a controller 90 (FIG. 2). The second detector 72 detects the recording material characteristics of the recording material S conveyed to the second conveyor 52 under the control of the controller 90 (FIG. 2). The first detector 71 and the second detector 72 include, for example, known media sensors.

The first detector 71 disposed in the first conveyor 51 preferably detects the recording material characteristics in the state where the recording material S is conveyed at the normal conveyance speed during image formation. By detecting the recording material characteristics at the normal conveyance speed, the recording material characteristics can be detected without decreasing productivity of the image forming job. Therefore, a sensor that detects the recording material characteristics of the recording material S in the conveyance state is preferably disposed as the first detector 71.

The second detector 72 disposed in the second conveyor 52 preferably detects the recording material characteristics in the state where the conveyance of the recording material S is stopped or the conveyance speed of the recording material S is lower than the normal conveyance speed of image formation. Detection accuracy of the recording material characteristics can be improved by detecting the recording material characteristics in the stopped state or low-speed conveyance state. Therefore, as the second detector 72, a sensor that detects the recording material characteristics is preferably disposed in the state where the conveyance of the recording material S is stopped or the conveyance speed is lowered, which can increase detection accuracy of the recording material characteristics.

The first detector 71 and the second detector 72 detect the type (for example, plain paper, high-quality paper, glossy paper, and the like) and size of the recording material S, physical properties of the recording material S, and the like. As the physical properties of the recording material S, for example, thickness, basis weight, surface conditions such as smoothness, stiffness, amount of electrification, moisture content, and grain (angle of fiber direction of the recording material) are detected.

The first detector 71 and the second detector 72 include various sensors for detecting the recording material characteristics. For example, the first detector 71 and the second detector 72 include imaging sensors for detecting the type of the recording material S. The imaging sensor includes a light source that emits light on the front surface of the recording material S, a light source that emits light from the back surface of the recording material S, and an image capturing device that captures the front surface of the recording material S. The imaging sensor acquires an image of the recording material S in a reflective state when light is emitted from the front and an image of the recording material S in a transmission state when light is emitted from the back.

The first detector 71 preferably includes a sensor that detects the recording material characteristics without contacting the recording material S. By detecting the recording material characteristics without deforming the recording material characteristics by external force, the first detector 71 can suppress the occurrence of conveyance failure of the recording material S in the image forming device 200. In particular, the first detector 71 can suppress the occurrence of conveyance failure, paper jam (so-called jam), and the like during conveyance of the recording material S in the image former 240 or a fixer 248.

The first detector 71 preferably includes a sensor that detects the recording material characteristics without electrifying the recording material S. By detecting the recording material characteristics without electrifying the recording material S, the first detector 71 can suppress the occurrence of conveyance failure (jam) due to sticking of the recording material S during conveyance, and the like. Charge transfer that is important in the electrophotographic process in the image former 240, for example, transfer of a toner image from an intermediate transfer belt 246 to the recording material S can be accurately performed.

By the first detector 71 performing non-contact and static-free detection of the recording material characteristics, the image forming system 10 can reduce the conveyance failure of the recording material S, improve transfer accuracy in image formation, and suppress a decrease in reliability of image formation.

The second detector 72 includes an optical sensor or a weight sensor for detecting the size, weight, and basis weight of the recording material S. The optical sensor includes a light-receiving element that detects the end of the recording material S on an inspection table through which the conveyed recording material S passes. The weight sensor detects the weight per unit area of the recording material S from the change in the weight of the inspection table when the recording material S passes. The second detector 72 can detect the size and area of the recording material S from an output of the optical sensor, and acquire the basis weight from the weight per unit area of the recording material S detected by the weight sensor.

For example, the second detector 72 includes a sensor that detects electrical characteristics of the recording material S as the recording material characteristics. The second detector 72 electrifies the recording material S with the sensor to detect the electrical resistance value, amount of electrification, moisture content, and the like of the recording material S as the recording material characteristics of the recording material S.

For example, the second detector 72 includes a sensor that detects the recording material characteristics in a direct contact test on the recording material S. The second detector 72 detects the stiffness of the recording material S as the recording material characteristics with the direct contact sensor.

[Image Forming Device]

The image forming device 200 illustrated in FIG. 1 includes an operation display 220, a scanner 230, the image former 240, a conveyor 250, and the like.

The operation display 220 includes an operator and a display.

Figure 3:
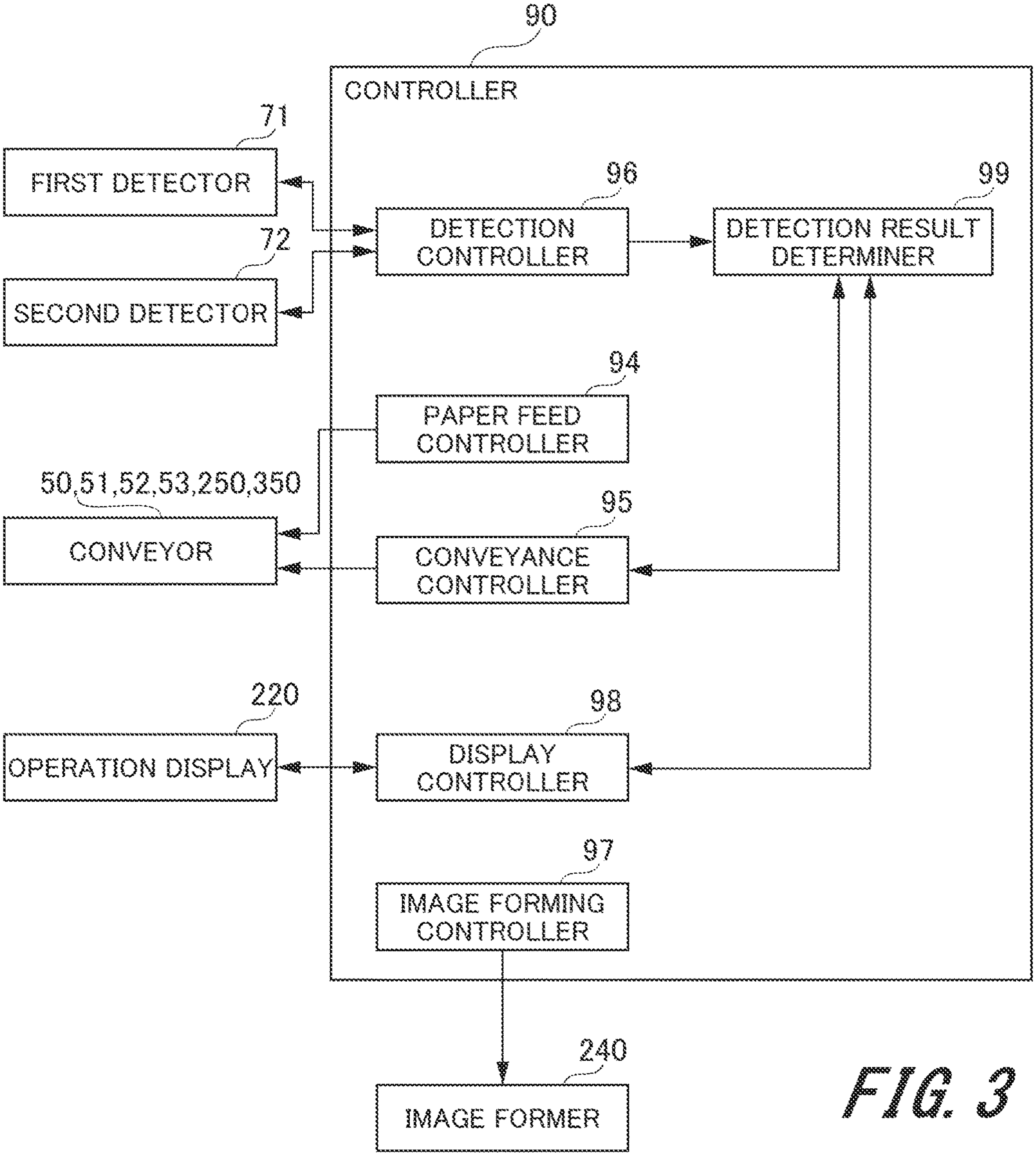
FIG. 3 is a functional block diagram of a controller of the image forming system of the first embodiment.

The display includes, for example, a display device such as a liquid crystal display (LCD), and displays various screens in response to instructions of a display signal input from a display controller 98 of the controller 90 (FIG. 3).

The operator includes a touch panel formed to cover the display screen of the display, and various operation buttons such as number buttons and a start button, and outputs an operation signal based on the user's operation to the controller 90 to be described later. The operator receives operation instructions from the user.

The scanner 230 optically scans a document conveyed from an auto document feeder (ADF) onto a contact glass or a document placed on the contact glass, forms an image of reflected light of light emitted and scanned from a light source to the document on a light-receiving surface of a charge coupled device (CCD) sensor, reads the document image, performs A/D conversion on the read image, and generates image data.

The image former 240 forms an image on the recording material S based on the image data. The image former 240 includes photoreceptor drums 241Y, 241M, 241C, and 241K, electrifiers 242Y, 242M, 242C, and 242K, exposers 243Y, 243M, 243C, and 243K, developers 244Y, 244M, 244C, and 244K, and primary transfer rollers 245Y, 245M, 245C, and 245K corresponding to yellow (Y), magenta (M), cyan (C), and black (K), respectively. In addition, the image former 240 includes the intermediate transfer belt 246, a secondary transfer roller 247, and the fixer 248.

The electrifiers 242Y, 242M, 242C, and 242K uniformly electrify the photoreceptor drums 241Y, 241M, 241C, and 241K, respectively.

The exposers 243Y, 243M, 243C, and 243K include laser light sources, polygon mirrors, lenses, and the like, and form an electrostatic latent image by scanning and exposing the surface of the photoreceptor drums 241Y, 241M, 241C, and 241K with a laser beam based on image data for each color.

The developers 244Y, 244M, 244C, and 244K develop the electrostatic latent image on the photoreceptor drums 241Y, 241M, 241C, and 241K by depositing toners for respective colors.

The primary transfer rollers 245Y, 245M, 245C, and 245K sequentially transfer the toner image of respective colors formed on the photoreceptor drums 241Y, 241M, 241C, and 241K onto the intermediate transfer belt 246 (primary transfer). That is, a color toner image in which four-color toner images are superimposed is formed on the intermediate transfer belt 246.

The secondary transfer roller 247 transfers the color toner image on the intermediate transfer belt 246 in one batch onto one surface of the recording material S fed from the feeding tray (secondary transfer).

The fixer 248 fixes the toner image on the recording material S by heating and applying pressure by causing the recording material S to pass through a nip formed by a fixing roller and a pressure roller.

The conveyor 250 includes a plurality of conveyance rollers 54 and the like provided along a predetermined conveyance route for conveying the recording material S. The conveyor 250 conveys the recording material along the predetermined conveyance route within the image forming device 200 by driving the conveyance rollers 54. Then, the conveyor 250 exports the recording material S after image formation to the post-processing device 300.

[Post-Processing Device]

The recording material S on which images are formed by the image forming device 200 is delivered to the post-processing device 300. The post-processing device 300 includes, for example, a plurality of post-processing units and performs predetermined post-processing in the post-processing unit specified by a job. For example, the post-processing device 300 includes a post-processing unit that performs processing such as perforating, folding, foil stamping, binding, cutting treatment, stapling, gluing, and binding.

In the post-processing device 300, the recording material S that is conveyed from the image forming device 200 and has undergone image forming processing is conveyed by a fifth conveyor 350 to a post-processing unit (not illustrated), and predetermined post-processing is performed on the recording material S. The recording material S conveyed by the fifth conveyor 350 is discharged from the second discharger 351 disposed along the conveyance route and discharged to a paper output tray 352.

[System Block Diagram]

FIG. 2 is a system block diagram of respective devices that constitute the image forming system 10 illustrated in FIG. 1 above. As illustrated in FIG. 2, the image forming system 10 includes the controller 90, a storage 81, a communicator 82, the scanner 230, an image processer the recording material feeder 70, the image former 240, the first detector 71, the second detector 72, and the conveyors 51, 52, 53, 250, and 350. Note that the configuration overlapping with the description of the image forming system 10 illustrated in FIG. 1 above is omitted below.

The controller 90 includes, for example, a central processing unit (CPU) 91, a read only memory (ROM) 92, a random access memory (RAM) 93, and the like. The CPU 91 reads various processing programs stored in the ROM 92 and expands the programs into the RAM 93, and centrally controls the operation of each unit of the image forming system 10 according to the expanded programs.

The ROM 92 stores various processing programs for controlling each unit of the image forming system 10, and parameters, table data, various files, and the like necessary for executing the programs.

The RAM 93 includes a volatile semiconductor memory and forms a work area that temporarily stores various processing programs read from the ROM 92, input or output data, parameters, and the like in various processes executed and controlled by the CPU 91.

The storage 81 stores, for example, image data received from external devices, and the like. The storage 81 stores various processing programs to be executed by the CPU 91, information on processing functions of the device necessary for executing the programs, image data read by the scanner 230, image data input from client devices and the like (not illustrated), the recording material characteristics of the recording material S detected by the first detector 71 or the second detector 72, and the like. The storage 81 may include, for example, a non-volatile memory such as a hard disk drive (HDD), a solid state drive (SSD), and a flash memory.

The communicator 82 includes a network interface card (NIC), modem, and the like. The communicator 82 connects the recording material feeding device 100, the recording material conveyance device 400, the image forming device 200, and the post-processing device 300 to a communications network such as a local area network (LAN) or wide area network (WAN), and sends and receives various data to and from external information devices (for example, client devices).

The operation display 220 includes a touch panel or the like provided with a pressure-sensitive or capacitive operator (touch sensor) in which transparent electrodes are arranged in a grid pattern on the display of liquid crystal display (LCD) or organic electro luminescence (EL) display. The operation display 220 functions as a display and operator. The display displays various operation screens in response to display control signals input from the controller 90. The operator receives various input operations by the user and outputs operation signals to the controller 90.

The scanner 230 optically scans a document placed on the contact glass, forms an image of reflected light from the document on a light-receiving surface of a charge coupled device (CCD) sensor, and reads the document image. The image read by the scanner 230 (analog image signal) is subjected to predetermined image processing by the image processer 80.

The image processer 80 includes a circuit that performs analog-to-digital (A/D) conversion processing and a circuit that performs digital image processing. The image processer generates digital image data by performing A/D conversion processing on the analog image signal from the scanner 230. The image processer 80 analyses a print job acquired from an external information device (for example, client device), rasterizes each page of the document, and generates digital image data. Then, the image processer 80 performs image processing, such as color conversion processing, correction processing (shading correction and the like) according to initial settings or user settings, and compression processing on the image data as required, and outputs the image data after the image processing to the image former 240.

[Functional Configuration of Controller]

Next, the functional configuration of the controller 90 will be described. FIG. 3 is a functional block diagram of the controller 90. As illustrated in FIG. 3, the controller 90 includes a paper feed controller 94, a conveyance controller 95, a detection controller 96, an image forming controller 97, the display controller 98, and a detection result determiner 99.

The paper feed controller 94 controls the feed of the recording material S from the recording material feeder 70 to the conveyor 50 in the recording material feeding device 100. The paper feed controller 94 feeds the recording material S to the conveyor 50 in line with the conveyance control of the recording material S by the conveyance controller 95.

The conveyance controller 95 controls the operation of the recording material S conveyance mechanism between and within the recording material feeding device 100, the recording material conveyance device 400, the image forming device 200, and the post-processing device 300 that constitute the image forming system 10. For example, the conveyance controller 95 controls the drive of the conveyor 50 of the recording material feeding device 100, the first conveyor 51, the second conveyor 52, and the third conveyor 53 of the recording material conveyance device 400, the conveyor 250 of the image forming device 200, the fifth conveyor 350 of the post-processing device 300, and other conveyors of the image forming system 10. With this configuration, the conveyance controller 95 controls the conveyance of the recording material S. The conveyance controller 95 controls the stop of the drive of each driver, the timing of drive start, adjustment of the drive speed, and the like under the conveyance condition according to the recording material characteristics of the recording material S. This control causes drivers to work together between respective devices of the image forming system 10, and controls the conveyance of the recording material S in the image forming system 10.

The conveyance controller 95 sets the conveyance condition for the recording material S according to the recording material characteristics acquired by the detection controller 96. For example, the conveyance controller 95 acquires the conveyance condition according to the recording material characteristics from data stored in the storage 81 and the like. Then, based on the data acquired from the storage 81 and the like, the conveyance controller 95 sets the conveyance condition for the configuration of each of the conveyor 50, the first conveyor 51, the second conveyor 52, the third conveyor 53, the conveyor 250, and the fifth conveyor 350.

The conveyance controller 95 selects the conveyance route for the recording material S from the second conveyor 52 or the third conveyor 53 in the recording material conveyance device 400, by switching the conveyance route for the recording material S conveyed by the first conveyor 51 at the branch 58. Then, the conveyance controller 95 controls the drive of the second conveyor 52 or the third conveyor 53 selected as the conveyance route to convey the recording material S. The conveyance controller 95 conveys at least one or more sheets of recording material S to the second conveyor 52 when conveying the plurality of recording materials S in the print job.

Furthermore, based on the determination of the detection result of the recording material characteristics by the detection result determiner 99, the conveyance controller 95 selects the conveyance route for the recording material S conveyed by the first conveyor 51 from one of the second conveyor 52 and the third conveyor 53, and switches the conveyance route for the recording material S at the branch 58. For example, based on the detection result of the recording material characteristics detected by the first detector 71, the conveyance controller 95 conveys, to the third conveyor 53, only the recording material S in which the detection result determiner 99 detects no abnormality. Then, based on the detection result of the recording material characteristics detected by the first detector 71, the conveyance controller 95 conveys, to the second conveyor 52, the recording material S in which the detection result determiner 99 detects an abnormality.

The conveyance controller 95 drives the first conveyor 51 and the third conveyor 53 by setting the conveyance speed of the recording material S to the normal speed when forming an image. The conveyance controller 95 conveys the recording material S from the recording material conveyance device 400 to the image forming device 200 by causing the first conveyor 51 and the third conveyor 53 to convey the recording material S.

In the second conveyor 52, after the entire recording material S is conveyed to the second conveyor 52, the conveyance controller 95 lowers the conveyance speed. That is, the conveyance controller 95 lowers the conveyance speed after the rear end of the recording material S passes through the branch 58.

Then, after the recording material S reaches the second detector 72, the conveyance controller 95 lowers the conveyance speed to a speed at which the second detector 72 can perform accurate detection. After conveying the recording material S to a position where the second detector 72 can detect the recording material characteristics, the conveyance controller 95 may stop conveyance of the recording material S until the detection of the recording material characteristics by the second detector 72 is finished.

Furthermore, the conveyance controller 95 conveys, to the first discharger 56, the recording material S after the second conveyor 52 detects the recording material characteristics, and discharges the recording material S from the first discharger 56 to outside the recording material conveyance device 400.

The detection controller 96 controls the detection of the recording material characteristics of the recording material S by the first detector 71 and the second detector 72. For example, when the recording material S is conveyed to the second conveyor 52 where the second detector 72 is provided, the detection controller 96 instructs the second detector 72 to detect the recording material characteristics. Based on this instruction, the second detector 72 starts detecting the recording material characteristics of the recording material S. When the recording material S passes the first conveyor 51 where the first detector 71 is disposed, the detection controller 96 instructs the first detector 71 to detect the recording material characteristics.

The detection controller 96 receives various data detected by the sensors of the first detector 71 and the second detector 72, and calculates the recording material characteristics of the recording material S based on these data. For example, in a configuration where the image forming system 10 includes a plurality of the second detectors 72, the detection controller 96 combines data acquired from the plurality of second detectors 72 and calculates the recording material characteristics of the recording material S. In a configuration where the image forming system 10 includes a plurality of the first detectors 71, the detection controller 96 combines data acquired from the plurality of first detectors 71 and calculates the recording material characteristics of the recording material S.

Furthermore, the detection controller 96 sends the calculated detection result of the recording material characteristics of the recording material S to the detection result determiner 99.

The image forming controller 97 controls the image forming operation in the image former 240 of the image forming device 200. The image forming controller 97 sets the image forming condition according to the recording material characteristics acquired by the detection controller 96. For example, the image forming controller 97 acquires the image forming condition according to the recording material characteristics from data stored in the storage 81 and the like. Then, the image forming controller 97 sets the operating condition for each configuration of the image former 240 based on the data acquired from the storage 81 and the like. Then, the image forming controller 97 controls the operation of each configuration of the image former 240 according to the set operating condition, and forms images on the recording material S based on image data.

The display controller 98 controls the display operation of the operation display 220 of the image forming device 200. The display controller 98 displays predetermined information on the display of the operation display 220 by transmitting predetermined display signals to the display. For example, the display controller causes the display to display information on the recording material characteristics detected by the first detector 71 or the second detector 72. With this display, the user or the like is notified of the information on the recording material characteristics of the recording material S. When the detection result determiner 99 detects an abnormality in the detection result of the recording material characteristics of the recording material S, the display controller 98 causes the display to display information on the recording material characteristics of the recording material S in which an abnormality is detected. With this display, the user or the like is notified of the occurrence of an abnormality in the recording material S in the image forming job and the information on the recording material characteristics of the recording material S in which an abnormality has occurred.

The detection result determiner 99 determines whether there is no abnormality in the detection result of the recording material characteristics by the first detector 71 and the second detector 72 acquired by the detection controller 96. For example, the detection result determiner 99 determines whether the detection result of the recording material characteristics by the first detector 71 acquired from the detection controller 96 agrees with the recording material setting condition set in the image forming job. Then, when the detection result of the recording material characteristics does not agree with the set condition, the detection result determiner 99 determines that an abnormality is detected in the detection result of the recording material characteristics of the recording material S detected by the first detector 71.

The detection result determiner 99 determines whether the detection result of the recording material characteristics by the first detector 71 acquired from the detection controller 96 matches the conveyance condition set by the conveyance controller 95 based on the recording material characteristics detected by the second detector 72 and the image forming condition set by the image forming controller 97. Then, when the detection result of the recording material characteristics does not match the conveyance condition or image forming condition, the detection result determiner 99 determines that an abnormality is detected in the detection result of the recording material characteristics of the recording material S detected by the first detector 71.

[Detection of Recording Material Characteristics]

Figure 4:
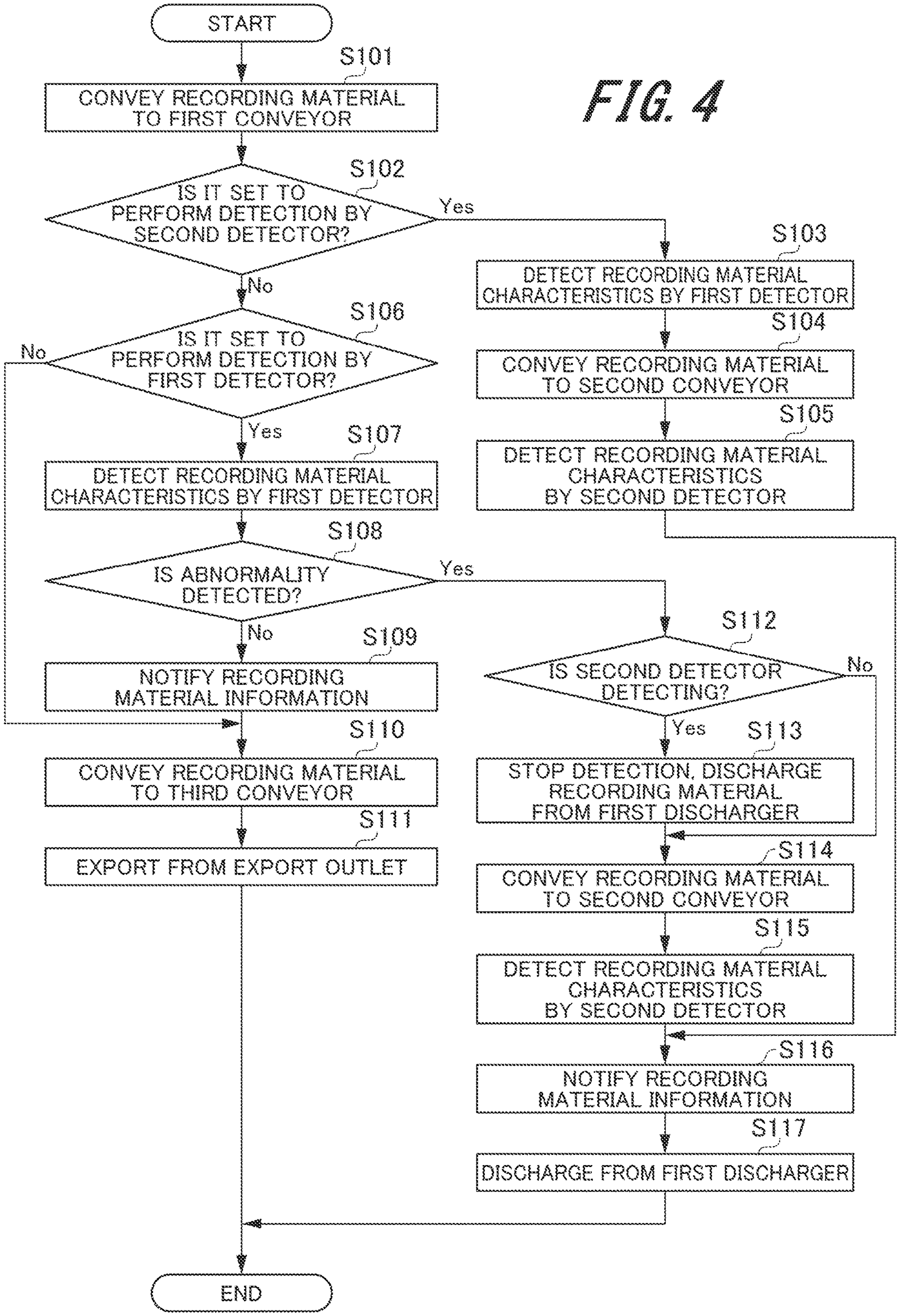
FIG. 4 is a flowchart of a method for detecting recording material characteristics in the image forming system of the first embodiment.

Next, processing for detecting the recording material characteristics in the image forming system 10 will be described. FIG. 4 is a flowchart of the processing for detecting the recording material characteristics. Note that the flowchart illustrated in FIG. 4 mainly describes the conveyance of the recording material in the recording material conveyance device 400 and the detection of the recording material characteristics.

To begin with, in the image forming system 10, the controller 90 conveys the recording material S from the conveyor 50 of the recording material feeding device 100 to the first conveyor 51 of the recording material conveyance device 400 (step S101).

Next, the controller 90 determines whether the measurement mode is set to detect the recording material characteristics of the recording material S by the second detector 72 by instructions of the user or the like (step S102).

When the measurement by the second detector 72 is set (Yes in step S102), the detection controller 96 detects the recording material characteristics of the recording material S conveyed to the first conveyor 51 by using the first detector 71 (step S103).

Then, after the first detector 71 detects the recording material characteristics of the recording material S, the controller 90 switches the conveyance route for the recording material S at the branch 58 and conveys the recording material S from the first conveyor 51 to the second conveyor 52 (step S104).

Next, the detection controller 96 detects the recording material characteristics of the recording material S conveyed to the second conveyor 52 by using the second detector 72 (step S105). At this time, the conveyance controller 95 conveys the recording material S at least to the position where the rear end of the recording material S conveyed to the second conveyor 52 passes through the branch 58. The passage of the recording material S through the branch 58 is determined from, for example, detection of the rear end of the recording material S by the second detector 72 disposed most upstream of the second conveyor 52, the conveyance speed and conveyance time of the recording material S after being delivered to the recording material conveyance device 400, and the like. While the second detector 72 is detecting the recording material characteristics, the conveyance controller 95 stops the conveyance of the recording material S by the second conveyor 52 or conveys the recording material S at a low speed. After the rear end of the recording material S passes through the branch 58, while the second detector 72 is detecting the recording material characteristics, the conveyance controller 95 may convey the next recording material S from the recording material feeding device 100 to the first conveyor 51.

When the measurement by the second detector 72 is not set (No in step S102), the controller 90 determines whether the measurement mode is set to detect the recording material characteristics of the recording material S by the first detector 71 by instructions of the user or the like (step S106).

When the measurement by the first detector 71 is set (Yes in step S106), the detection controller 96 detects the recording material characteristics of the recording material S conveyed to the first conveyor 51 by using the first detector 71 (step S107). At this time, while the first detector 71 is detecting the recording material characteristics, the conveyance controller 95 preferably conveys the recording material S without changing the conveyance speed in the first conveyor 51.

Next, the detection result determiner 99 compares the recording material characteristics of the recording material S detected by the first detector 71 with the appropriate range of setting conditions for the recording material set in the image forming job, and determines whether an abnormality is detected in the detection result of the recording material characteristics (step S108).

When no abnormality is detected in the detection result of the recording material characteristics (No in step S108), the display controller 98 displays the recording material characteristics of the recording material S detected by the first detector 71 on the operation display 220 of the image forming device 200 (step S109). With this display, the image forming system 10 notifies the user and the like of the recording material characteristics of the recording material S and the like. For example, the display controller 98 acquires the recording material characteristics such as the type of the recording material S acquired from the detection controller 96 by using the first detector 71, and outputs the recording material characteristics to the operation display 220. The display controller 98 acquires the determination result of the recording material characteristics of the recording material S from the detection result determiner 99, and outputs to the operation display 220 that there is no abnormality in the recording material S. Note that this process can be performed in any order with the process from step S110 to step S111 to be described later. Therefore, this process may be performed after the process from step S110 to step S111 or at the same time as the process from step S110 to step S111.

When the measurement by the first detector 71 is not set (No in step S106), or after determining the detection result of the recording material characteristics in step S108, the conveyance controller 95 switches the conveyance route for the recording material S detected by the first detector 71 at the branch 58, and conveys the recording material S from the first conveyor 51 to the third conveyor 53 (step S110).

Then, the conveyance controller 95 exports the recording material S conveyed by the third conveyor 53 from the export outlet 57 (Step S111). By exporting the recording material S from the export outlet 57, the conveyance controller 95 conveys the recording material S from the recording material conveyance device 400 to the image forming device 200.

When the recording material characteristics of the recording material S are not within the appropriate range (Yes in step S108), the controller 90 determines whether the detection controller 96 is detecting the recording material characteristics of the recording material S conveyed earlier by the second detector 72 (step S112).

When the second detector 72 is detecting the recording material characteristics of the recording material S conveyed earlier (Yes in step S112), the detection controller 96 stops detecting the recording material characteristics by the second detector 72, and the conveyance controller 95 discharges the recording material S conveyed earlier from the first discharger 56 (step S113).

When the second detector 72 is not detecting the recording material characteristics of the recording material S conveyed earlier (No in step S112), or after discharging the recording material S from the first discharger 56 in step S113, the conveyance controller 95 switches the conveyance route at the branch 58 for the recording material S in which an abnormality is detected in the detection result of the recording material characteristics by the first detector 71, and conveys the recording material S to the second conveyor 52 (step S114).

Then, the detection controller 96 detects the recording material characteristics of the recording material S by the second detector 72 (step S115). At this time, the conveyance controller 95 conveys the recording material S at least to the position where the rear end of the recording material S conveyed to the second conveyor 52 passes through the branch 58. While the second detector 72 is detecting the recording material characteristics, the conveyance controller 95 stops the conveyance of the recording material S by the second conveyor 52 or conveys the recording material S at a low speed. After the rear end of the recording material S passes through the branch 58, the conveyance controller 95 may convey the next recording material S from the recording material feeding device 100 to the first conveyor 51 and the first detector 71 may detect the recording material characteristics.

When the first detector 71 detects an abnormality in a plurality of recording materials S among the recording materials S conveyed to the recording material conveyance device 400, the controller 90 may detect the recording material characteristics of all the recording materials S in which an abnormality is detected by the second detector 72. However, the controller 90 preferably detects the recording material characteristics of only the last recording material in which an abnormality is detected in the recording material characteristics by the second detector 72. If the recording material S is stopped in the second conveyor 52 for detection by the second detector 72, the succeeding recording material S cannot be conveyed to the second conveyor 52. Therefore, when conveying a plurality of recording materials S to the second conveyor 52, it is difficult to perform the detection of the recording material characteristics by the second detector 72 on all the recording materials S. Therefore, when an abnormality in the recording material characteristics is detected in a plurality of recording materials S, it is preferable to convey all the recording materials S in which an abnormality is detected to the second conveyor 52, and to detect, by the second detector 72, the recording material characteristics of only the recording material S that is conveyed last in which an abnormality is detected.

After the second detector 72 detects the recording material characteristics of the recording material S in step S105, or after conveying the recording material S to the second conveyor 52 in step S115, the display controller 98 displays, on the operation display 220 of the image forming device 200, at least one or more pieces of information including the recording material characteristics of the recording material S detected by the first detector 71, the recording material characteristics of the recording material S detected by the second detector 72, and the recording material characteristics determined to be abnormal by the detection result determiner 99 (step S116). With this display, the image forming system 10 notifies the user and the like of the recording material characteristics of the recording material S and the like. For example, the display controller 98 acquires, from the detection controller 96, the recording material characteristics such as the type of the recording material S acquired by using the first detector 71, and outputs the recording material characteristics to the operation display 220.

The controller 90 acquires, from the detection controller 96, the detailed recording material characteristics such as the type and physical properties of the recording material S acquired using the second detector 72, and outputs the recording material characteristics to the operation display 220. Furthermore, the display controller 98 acquires the determination result of the recording material characteristics of the recording material S from the detection result determiner 99 and outputs the information on the recording material characteristics in which an abnormality is detected in the recording material S to the operation display 220. Note that this process can be performed in any order with the process of step S117 to be described later. Therefore, this process may be performed after the process of step S117 or at the same time as the process of step S117.

Next, the conveyance controller 95 discharges the recording material S conveyed by the second conveyor 52 from the first discharger 56 (step S117).

After discharging the recording material S from the first discharger 56 or the export outlet 57, the process according to this flowchart is finished.

In the process according to the flowchart described above, the image forming system 10 conveys the recording material S (first sheet or first recording material S) in which the second detector 72 detects the recording material characteristics from the first conveyor 51 to the second conveyor 52, and the second detector 72 detects the recording material characteristics. Then, the image forming system 10 does not convey the recording material S in which the second detector 72 detects the recording material characteristics to the image forming device 200, but discharges the recording material S from the first discharger 56 of the recording material conveyance device 400.

The image forming system 10 conveys the next recording material S to be conveyed following the first recording material S (second sheet or second recording material S) to the first conveyor 51, and the first detector 71 detects the recording material characteristics. The image forming system 10 determines whether there is an abnormality in the recording material characteristics of the recording material S detected by the first detector 71, and conveys only the recording material S in which no abnormality is detected from the third conveyor 53 to the image forming device 200.

If the first detector 71 detects an abnormality in the recording material characteristics, the image forming system 10 conveys the second recording material to the second conveyor 52. At this time, if the recording material S of which the second detector 72 is detecting the recording material characteristics (first recording material) stays in the second conveyor 52, the image forming system 10 stops the detection of the recording material characteristics of the staying first recording material S by the second detector 72, and discharges the first recording material S from the first discharger 56. This makes the conveyance route of the second conveyor 52 empty and ready to convey the next recording material S (second recording material S). As a result, the image forming system 10 can convey, to the second conveyor 52, the second recording material S in which the first detector 71 detects an abnormality in the recording material characteristics.

In this way, by promptly conveying the second recording material S in which the first detector 71 detects an abnormality in the recording material characteristics to the second conveyor 52, the image forming system 10 can convey the next recording material S (third sheet or third recording material S) from the recording material feeding device 100 to the first conveyor 51.

Therefore, in the second conveyor 52, if an abnormality is detected in the recording material characteristics of the succeeding second recording material S while the detector is detecting the recording material characteristics of the preceding first recording material S, the image forming system 10 does not have to stop the conveyance of the recording material S. This allows the image forming system 10 described above to suppress a decrease in productivity of the image forming device.

Such an image forming system 10 is assumed to be operated, for example, as follows.

Recording materials of the same type are usually loaded in a paper feed tray of the recording material feeder 70 of the recording material feeding device 100. The recording material S, which is replaced by replenishment or the like, does not always have constant recording material characteristics. Furthermore, the recording material characteristics also change depending on external factors such as temperature and humidity. Therefore, the image forming system 10 cannot determine what kind of recording material characteristics of the recording material S is loaded in the recording material feeder 70 until the detector detects the recording material characteristics.

Therefore, the image forming system 10 detects the recording material characteristics of the recording material S of the first sheet conveyed to the recording material conveyance device 400 with high accuracy. That is, the second detector 72 that stops the conveyance of the recording material S or detects the recording material characteristics at a low conveyance speed detects the recording material characteristics of the recording material S with high accuracy. This allows the image forming system 10 to acquire detailed information about the recording material S loaded in the recording material feeder 70. As a result, the image forming system 10 can set image forming conditions and conveyance conditions that match the recording material characteristics of the recording material S.

In order not to reduce productivity in the image forming job, the recording material S of the second and subsequent sheets conveyed to the recording material conveyance device 400 is conveyed at the normal conveyance speed, and the first detector detects the recording material characteristics of the recording material S.

Detailed recording material characteristics of the recording material S of the second and subsequent sheets are not detected. Only predetermined recording material characteristics that can be detected at the normal conveyance speed are detected and are compared with the recording material characteristics of the recording material S of the first sheet. When the recording material characteristics detected in the recording material S of the second and subsequent sheets are the same as those of the first sheet, or when the difference in the recording material characteristics is within an allowable range, it can be determined that the recording material S of the second and subsequent sheets having the same recording material characteristics as the first sheet has been conveyed. Therefore, the recording material S of the second and subsequent sheets can be conveyed to the third conveyor 53 and can be conveyed from the recording material conveyance device 400 to the image forming device 200 to execute the image forming job.

In this process, the recording material S of the second and subsequent sheets can be conveyed at the normal conveyance speed, and therefore a decrease in productivity in the image forming job can be suppressed.

Meanwhile, if an abnormality is detected in detection of the recording material characteristics of the recording material S of the second and subsequent sheets, that is, if the difference between the recording material characteristics detected in the recording material S of the second and subsequent sheets and the recording material characteristics of the recording material S of the first sheet exceeds an allowable range, the recording material S in which an abnormality is detected is conveyed to the second conveyor 52 side and discharged from the first discharger 56. Since the recording material S in which an abnormality is detected is not conveyed to the image forming device 200, it is possible to suppress the occurrence of a load on the image former 240 and the occurrence of a conveyance failure (jam, and the like) due to the conveyance of the recording material S that is not suitable for the conveyance condition. Since the succeeding recording material S can be conveyed at the normal conveyance speed, it is possible to suppress a decrease in productivity in the image forming job.

When discharging the recording material S in which an abnormality is detected from the first discharger 56 via the second conveyor 52, the recording material S (first sheet) may stay on the second detector 72 in some cases. For example, to further optimize the image forming condition and conveyance condition, the second detector 72 may be detecting the recording material characteristics in more detail. In this case, the detection of the recording material characteristics by the second detector 72 is stopped, and the recording material S (first sheet) is quickly discharged from the first discharger 56. This empties the conveyance route of the second conveyor 52, and the recording material S (second and subsequent sheets) in which an abnormality is detected is conveyed to the second conveyor 52. Since this allows the succeeding recording material S to be conveyed to the first conveyor 51, a decrease in productivity in the image forming job can be suppressed.

After the recording material S in which an abnormality is detected is conveyed to the second conveyor 52, the second detector 72 may detect more detailed recording material characteristics. Since the second detector 72 detects the recording material characteristics of the recording material S in which an abnormality is detected, the user or the like can be notified of more detailed recording material characteristics of the recording material S determined to be abnormal. By notifying the detailed recording material characteristics of the recording material S in which an abnormality is detected to make the user or the like aware of information such as the cause of the occurrence of the abnormality in an early stage, it is possible to suppress troubles such as the stop of the image forming system 10, and to suppress a decrease in productivity of the image forming system 10.

Note that the recording material S of which detailed recording material characteristics are detected by the second detector 72 is not limited to the recording material S of the first sheet for which the image forming job is started, and can be set arbitrarily. For example, when the recording material feeding device 100 is replenished with the recording material S, when the paper feed tray in which the recording material S is fed is changed, when a predetermined number of sheets of the recording material S is conveyed from the commencement of the image forming job, and when predetermined time elapses from the commencement of the image forming job, the recording material S may be conveyed to the second conveyor 52 and the second detector 72 may detect detailed recording material characteristics.

2. Second Embodiment of Recording Material Conveyance Device and Image Forming System Next, the second embodiment of a recording material conveyance device and an image forming system will be described. Note that the image forming system of the second embodiment differs from the above-described image forming system of the first embodiment only in the configuration of a recording material conveyor from the recording material conveyance device to the post-processing device and the placement of the detector. Therefore, only the configuration relating to the recording material conveyor and the detector are described, and the same configuration as in the first embodiment are omitted.

Figure 5:
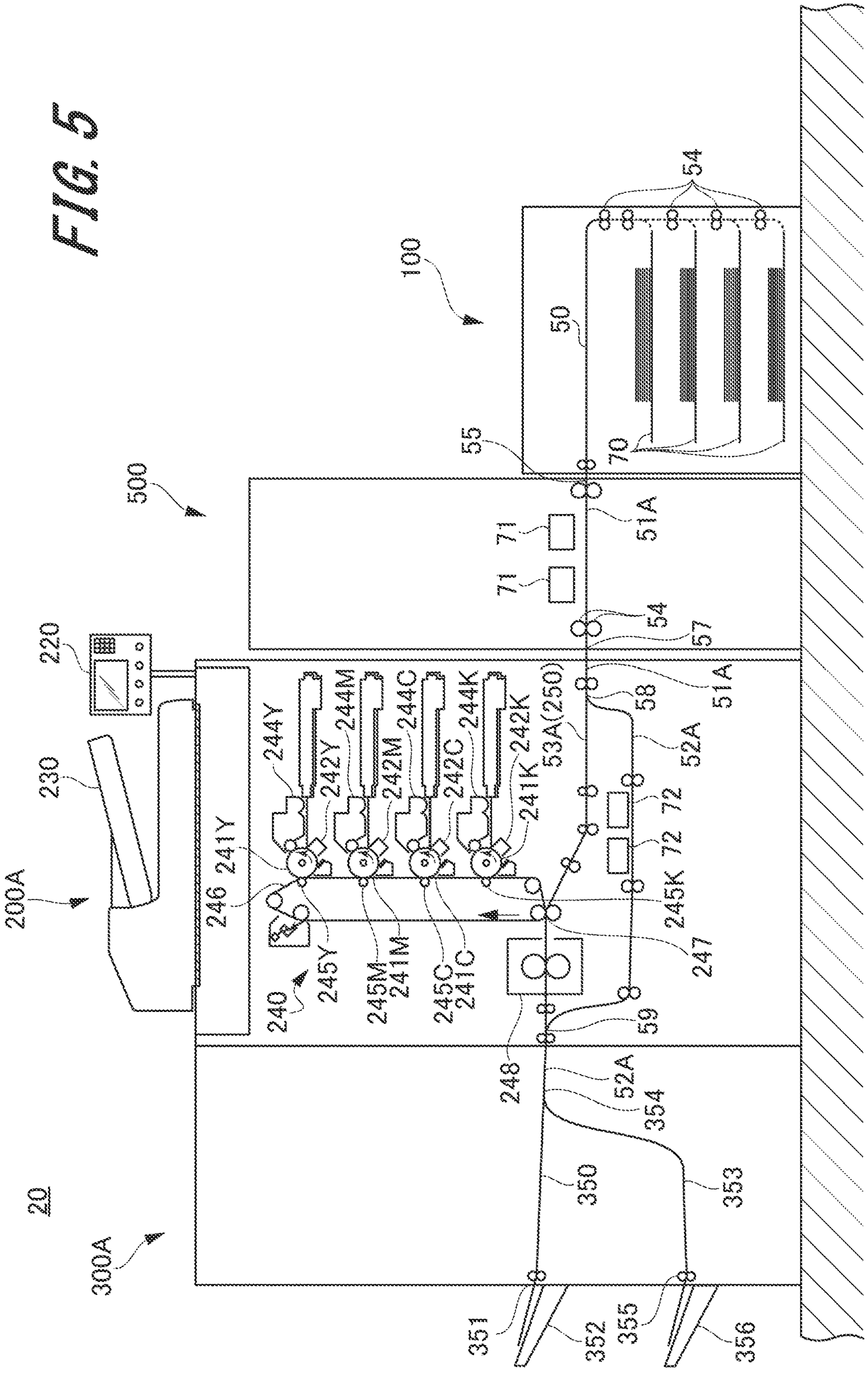
FIG. 5 is a diagram illustrating a schematic configuration of an image forming system of a second embodiment.

FIG. 5 illustrates the configuration of the recording material conveyance device and the image forming system according to the second embodiment.

As illustrated in FIG. 5, an image forming system 20 includes a recording material feeding device 100, a recording material conveyance device 500, an image forming device 200A, and a post-processing device 300A. In the image forming system 20 illustrated in FIG. 5, the recording material feeding device 100 has the same configuration as in the first embodiment described above.

[Recording Material Conveyance Device]

The recording material conveyance device 500 includes a delivery inlet 55 where the recording material S is delivered to the recording material conveyance device 500, a first conveyor 51A that conveys the recording material S, and an export outlet 57 that exports the recording material S from the first conveyor 51A to the image forming device 200A. First detectors 71 for detecting the recording material characteristics of the recording material S are disposed in the first conveyor 51A.

In the first conveyor 51A, the plurality of first detectors 71 is provided on the first conveyor 51A. The first conveyor 51A preferably has a configuration in which the conveyance distance of the recording material S from the delivery inlet 55 to the export outlet 57 is the shortest.

[Image Forming Device]

The image forming device 200A can have the same configuration as in the first embodiment described above, except for the configuration of the recording material conveyance route.

The image forming device 200A includes part of the first conveyor 51A, a second conveyor 52A and a third conveyor 53A that branch off from the first conveyor 51A on the downstream side of the recording material conveyance direction. Furthermore, the image forming device 200A includes a branch 58 where the second conveyor 52A and the third conveyor 53A branch off from the first conveyor 51A and a joiner 59 where the third conveyor 53A that has branched off joins the second conveyor 52A again.

A second detector 72 is disposed in the second conveyor 52A of the image forming device 200A. The second detector 72 is disposed upstream of the joiner 59 in the second conveyor 52A. Therefore, unlike the first embodiment, only the first conveyor 51A and the first detectors 71 are disposed in the recording material conveyance device 500. The second conveyor 52A, the third conveyor 53A, the branch 58, and the second detector 72 are disposed in the image forming device 200A.

The second conveyor 52A constitutes the conveyance route that exports the recording material S from the image forming device 200A without passing through an image former 240. That is, the second conveyor 52A includes the conveyance route from the branch 58 in the image forming device 200A to a branch 354 in the post-processing device 300A. Therefore, the recording material S to be conveyed to the second conveyor 52A is conveyed from the first conveyor 51A through the branch 58 to the second conveyor 52A. Furthermore, the recording material S passes through the joiner 59 and is exported to the post-processing device 300A.

The third conveyor 53A constitutes the conveyance route that causes the recording material S to pass through the image former 240.

The third conveyor 53A constitutes the conveyance route from the branch 58 to the joiner 59 in the image forming device 200. Therefore, the recording material S to be conveyed to the third conveyor 53A is conveyed from the first conveyor 51A through the branch 58 to the third conveyor 53A. After passing through the image former 240 and a fixer 248 by the third conveyor 53A, the recording material S is conveyed to the second conveyor 52A at the joiner 59.

[Post-Processing Device]

The post-processing device 300A can have the same configuration as in the first embodiment described above, except for the configuration of the recording material conveyance route and a paper ejector.

The post-processing device 300A includes part of the second conveyor 52A, a fourth conveyor 353 and a fifth conveyor 350 that branch off from the second conveyor 52A on the downstream side of the recording material conveyance direction, and the branch 354 where the fourth conveyor 353 and the fifth conveyor 350 branch off from the second conveyor 52A. The post-processing device 300A also includes a first discharger 355 from which the recording material S conveyed by the fourth conveyor 353 is discharged and a paper output tray 356 on which the recording material S discharged from the first discharger 355 is loaded. Furthermore, the post-processing device 300A includes a second discharger 351 from which the recording material S conveyed by the fifth conveyor 350 is discharged and a paper output tray 352 on which the recording material S discharged from the second discharger 351 is loaded.

In the post-processing device 300A, the recording material S conveyed by the second conveyor 52A, that is, the recording material S that does not pass through the image former 240 is conveyed from the branch 354 to the fourth conveyor 353. Then, the recording material S conveyed by the fourth conveyor 353 is discharged to the first discharger 355.

In the post-processing device 300A, the recording material S that is conveyed by the third conveyor 53A and passes through the image former 240 is conveyed to the fifth conveyor 350. Then, the recording material S conveyed by the fifth conveyor 350 is discharged to the second discharger 351.

[Functional Configuration of Controller]

A controller 90 of the image forming system 20 can have the same functional configuration as in the first embodiment described above.

The conveyance controller 95 causes the first conveyor 51A to convey the recording material S in the recording material conveyance device 500. In the image forming device 200A, the conveyance controller 95 selects the conveyance route for the recording material S to either the second conveyor 52A or the third conveyor 53A, and switches the conveyance route for the recording material S at the branch 58. Then, the conveyance controller 95 controls the drive of the second conveyor 52A or the third conveyor 53A selected as the conveyance route to convey the recording material S from the first conveyor 51A.

Furthermore, in the post-processing device 300A, the conveyance controller 95 selects the conveyance route for the recording material S to either the fourth conveyor 353 or the fifth conveyor 350, and switches the conveyance route for the recording material S at the branch 354. Then, the conveyance controller 95 controls the drive of the fourth conveyor 353 or the fifth conveyor 350 selected as the conveyance route to convey the recording material S and discharge the recording material S from the first discharger 355 or the second discharger 351.

The conveyance controller 95 causes the first conveyor 51A to convey the recording material S in which the first detector 71 detects the recording material characteristics at the normal conveyance speed. The detection controller 96 causes the first detector 71 disposed in the first conveyor 51A to detect the recording material characteristics of the recording material S that is being conveyed.

The conveyance controller 95 switches the conveyance route at the branch 58 in the image forming device 200A, and conveys the recording material S in which the second detector 72 detects the recording material characteristics to the second conveyor 52A. Then, the detection controller 96 causes the second detector 72 disposed in the second conveyor 52A to detect the recording material characteristics of the recording material S.

Meanwhile, the conveyance controller 95 switches the conveyance route at the branch 58 in the image forming device 200A, and conveys the recording material S in which the second detector 72 does not detect recording material characteristics to the third conveyor 53A. Then, the image forming controller 97 causes the image former 240 to form an image on the recording material S conveyed by the third conveyor 53A.

With the above-described configuration, for example, the image forming system 20 conveys the recording material S of the first sheet from the recording material conveyance device 500 to the second conveyor 52A of the image forming device 200A, and the second detector 72 detects detailed recording material characteristics. For the recording material S of the second and subsequent sheets, the first detector 71 disposed in the first conveyor 51A of the recording material conveyance device 500 detects the recording material characteristics during conveyance at the normal conveyance speed. When there is no abnormality in the recording material characteristics detected by the first detector 71, the recording material S is conveyed from the recording material conveyance device 500 to the third conveyor 53A of the image forming device 200A. This allows the recording material S having no abnormality in the recording material characteristics to be conveyed to the image former 240 to form an image.

If there is an abnormality in the recording material characteristics detected by the first detector 71, the recording material S (second recording material) is conveyed from the recording material conveyance device 500 to the second conveyor 52A of the image forming device 200A. At this time, if the recording material S in which the second detector 72 is detecting the recording material characteristics (first recording material S) stays in the second conveyor 52A of the image forming device 200A, the second detector 72 stops detecting the recording material characteristics and conveys this first recording material S from the image forming device 200A to the post-processing device 300A. Then, in the post-processing device 300A, the recording material S is conveyed from the second conveyor 52A to the fourth conveyor 353 at the branch 354 and discharged from the first discharger 355. Then, the second recording material S in which an abnormality is detected in the recording material characteristics can be conveyed from the recording material conveyance device 500 to the second conveyor 52A of the image forming device 200A, and further conveyed to the fourth conveyor 353 of the post-processing device 300A and discharged from the first discharger 355. At this time, the second detector 72 may detect the detailed recording material characteristics of the second recording material S.

The above-described configuration allows the recording material S in which an abnormality in the recording material characteristics is detected by the first detector 71 to be promptly discharged from the image forming system 20 without passing through the image former 240. In this way, quickly discharging the recording material S in which an abnormality is detected allows the succeeding recording material S to be conveyed from the first conveyor 51A to the image former 240. Therefore, a decrease in productivity in the image forming job can be suppressed. Since the recording material S in which an abnormality is detected is not conveyed to the image former 240, it is possible to suppress the occurrence of a load on the image former 240 and the occurrence of a conveyance failure (jam, and the like) due to the conveyance of the recording material S that is not suitable for the conveyance condition. Since the succeeding recording material S can be conveyed at the normal conveyance speed, it is possible to suppress a decrease in productivity in the image forming job.

[Detection of Recording Material Characteristics]

Figure 6:
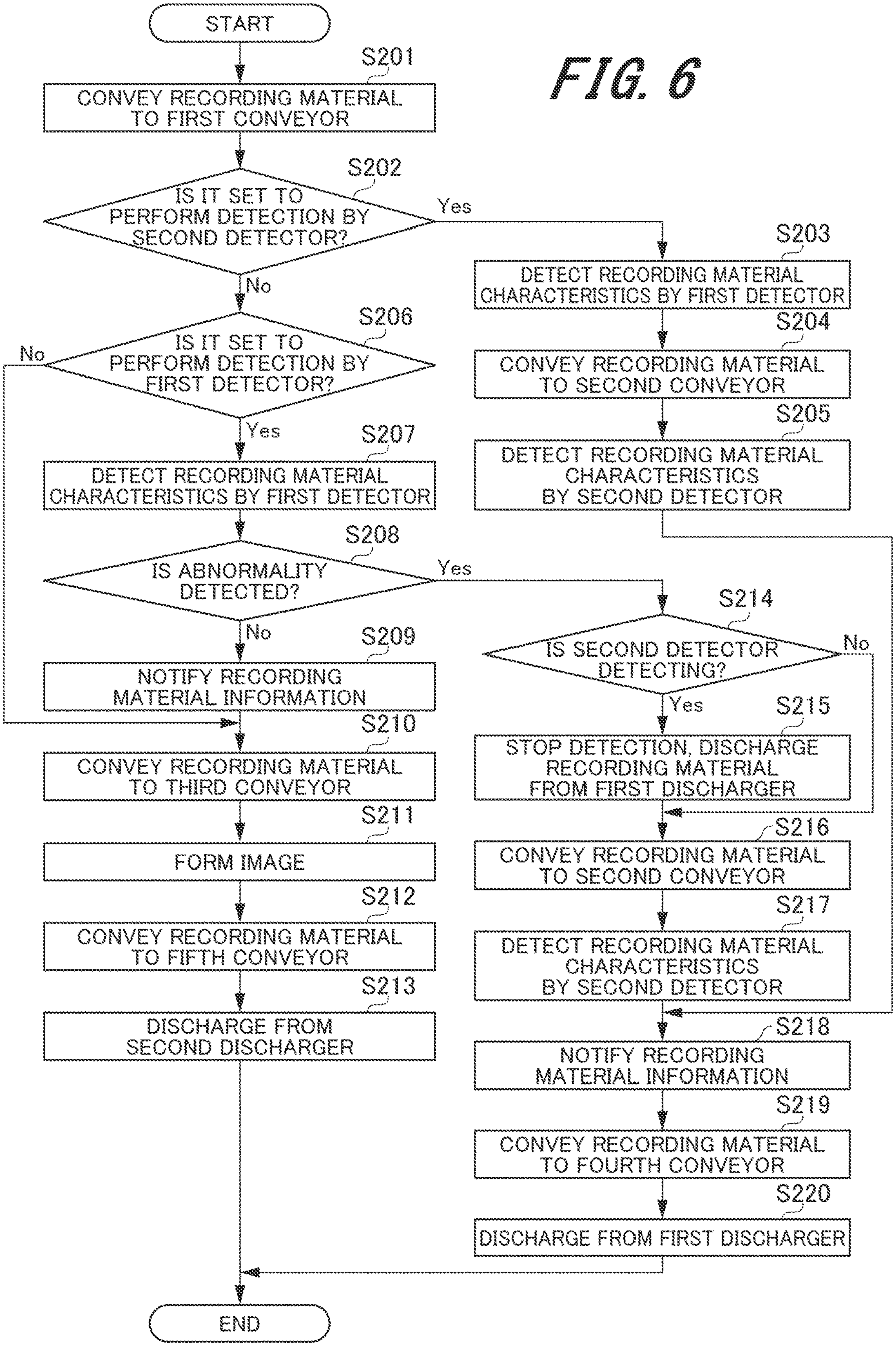
FIG. 6 is a flowchart of a method for detecting recording material characteristics in the image forming system of the second embodiment.

Next, processing for detecting the recording material characteristics in the image forming system 20 will be described. FIG. 6 is a flowchart of the processing for detecting the recording material characteristics. Note that the flowchart illustrated in FIG. 6 mainly describes the conveyance of the recording material and the detection of the recording material characteristics in the image forming system 20.

To begin with, in the image forming system 20, the controller 90 conveys the recording material S from the conveyor 50 of the recording material feeding device 100 to the first conveyor 51A of the recording material conveyance device 400 (step S201).

Next, the controller 90 determines whether the measurement mode is set to detect the recording material characteristics of the recording material S by the second detector 72 by instructions of the user or the like (step S202).

When the measurement by the second detector 72 is set (Yes in step S202), the detection controller 96 detects the recording material characteristics of the recording material S conveyed to the first conveyor 51A by using the first detector 71 (step S203).

Then, after the first detector 71 detects the recording material characteristics of the recording material S, the detection controller 96 switches the conveyance route for the recording material S at the branch 58 of the image forming device 200A and conveys the recording material S from the first conveyor 51A to the second conveyor 52A (step S204).

Next, the detection controller 96 detects the recording material characteristics of the recording material S conveyed to the second conveyor 52A by using the second detector 72 (step S205). At this time, the conveyance controller 95 conveys the recording material S at least to the position where the rear end of the recording material S conveyed to the second conveyor 52A passes through the branch 58. The passage of the recording material S through the branch 58 is determined from, for example, detection of the rear end of the recording material S by the second detector 72 disposed most upstream of the second conveyor 52A, the conveyance speed and conveyance time of the recording material S after being delivered to the recording material conveyance device 400, and the like. While the second detector 72 is detecting the recording material characteristics, the conveyance controller 95 stops the conveyance of the recording material S by the second conveyor 52A or conveys the recording material S at a low speed. After the rear end of the recording material S passes through the branch 58, while the second detector 72 is detecting the recording material characteristics, the conveyance controller 95 may convey the next recording material S from the recording material feeding device 100 to the first conveyor 51A.

When the measurement by the second detector 72 is not set (No in step S202), the controller 90 determines whether the measurement mode is set to detect the recording material characteristics of the recording material S by the first detector 71 by instructions of the user or the like (step S206).

When the measurement by the first detector 71 is set (Yes in step S206), the detection controller 96 detects the recording material characteristics of the recording material S conveyed to the first conveyor 51A by using the first detector 71 (step S207). At this time, while the first detector 71 is detecting the recording material characteristics, the conveyance controller 95 preferably conveys the recording material S without changing the conveyance speed in the first conveyor 51A.

Next, a detection result determiner 99 compares the recording material characteristics of the recording material S detected by the first detector 71 with the appropriate range of setting conditions for the recording material set in the image forming job, and determines whether an abnormality is detected in the detection result of the recording material characteristics (step S208).

When no abnormality is detected in the detection result of the recording material characteristics (No in step S208), a display controller 98 displays the recording material characteristics of the recording material S detected by the first detector 71 on an operation display 220 of the image forming device 200 (step S209). With this display, the image forming system 20 notifies the user and the like of the recording material characteristics of the recording material S and the like. For example, the display controller 98 acquires the recording material characteristics such as the type of the recording material S acquired from the detection controller 96 by using the first detector 71, and outputs the recording material characteristics to the operation display 220. The display controller 98 acquires the determination result of the recording material characteristics of the recording material S from the detection result determiner 99, and outputs to the operation display 220 that there is no abnormality in the recording material S. Note that this process can be performed in any order with the process from step S210 to step S213 to be described later. Therefore, this process may be performed after the process from step S210 to step S213 or at the same time as the process from step S210 to step S213.

When the measurement by the first detector 71 is not set (No in step S206), or after determining the detection result of the recording material characteristics in step S208, the conveyance controller 95 switches the conveyance route at the branch 58 to convey the recording material S conveyed by the first conveyor 51A to the third conveyor 53A in the image forming device 200A (step S210).

Then, the conveyance controller 95 conveys the recording material S conveyed by the third conveyor 53A to the image former 240, and the image forming controller 97 drives the image former 240 to form an image on the recording material S (step S211).

Next, the conveyance controller 95 conveys the recording material S conveyed by the third conveyor 53A from the joiner 59 to the second conveyor 52A in the image forming device 200A, switches the conveyance route at the branch 354 in the post-processing device 300A, and conveys the recording material S from the second conveyor 52A to the fifth conveyor 350 (step S212).

Then, the conveyance controller 95 discharges the recording material S conveyed by the fifth conveyor 350 from the second discharger 351 (step S213). By discharging the recording material S from the second discharger 351, the conveyance controller 95 discharges the recording material S on which an image has been formed from the image forming system 20.

When the recording material characteristics of the recording material S are not within the appropriate range (Yes in step S208), the controller 90 determines whether the detection controller 96 is detecting the recording material characteristics of the recording material S conveyed earlier by the second detector 72 (step S214).

When the second detector 72 is detecting the recording material characteristics of the recording material S conveyed earlier (Yes in step S214), the detection controller 96 stops detecting the recording material characteristics by the second detector 72, and the conveyance controller 95 discharges the recording material S conveyed earlier from the first discharger 355 (step S215). At this time, the conveyance controller 95 causes the recording material S conveyed by the second conveyor 52A to pass through the joiner 59 in the image forming device 200A. Furthermore, in the post-processing device 300A, the conveyance controller 95 switches the conveyance route at the branch 354 to convey the recording material S from the second conveyor 52A to the fourth conveyor 353 and discharge the recording material S from the first discharger 355.

When the second detector 72 is not detecting the recording material characteristics of the recording material S conveyed earlier (No in step S214), or after discharging the recording material S conveyed earlier from the first discharger 355 in step S215, the conveyance controller switches the conveyance route at the branch 58 of the image forming device 200A to convey the recording material S in which an abnormality is detected in the detection result of the recording material characteristics by the first detector 71 to the second conveyor 52A (step S216).

Then, the detection controller 96 detects the recording material characteristics of the recording material S by the second detector 72 (step S217). At this time, the conveyance controller 95 conveys the recording material S at least to the position where the rear end of the recording material S conveyed to the second conveyor 52A passes through the branch 58. While the second detector 72 is detecting the recording material characteristics, the conveyance controller 95 stops the conveyance of the recording material S by the second conveyor 52A or conveys the recording material S at a low speed. After the rear end of the recording material S passes through the branch 58, the conveyance controller 95 may convey the next recording material S from the recording material feeding device 100 to the first conveyor 51A and the first detector 71 may detect the recording material characteristics.

When an abnormality is detected in a plurality of recording materials S in which the first detector 71 detects the recording material characteristics, the controller 90 may cause the second detector 72 to detect the recording material characteristics of all the recording materials S in which an abnormality has been detected. However, the controller 90 preferably causes the second detector 72 to detect the recording material characteristics of only the last recording material in which an abnormality is detected in the recording material characteristics. If the recording material S is stopped by the second conveyor 52A for detection by the second detector 72, the succeeding recording material S cannot be conveyed to the second conveyor 52A. Therefore, when conveying the plurality of recording materials S to the second conveyor 52A, it is difficult to perform the detection of the recording material characteristics by the second detector 72 on all the recording materials S. Therefore, when an abnormality in the recording material characteristics is detected in the plurality of recording materials S, the controller 90 preferably conveys all the recording materials S in which an abnormality is detected to the second conveyor 52A, and performs the detection of the recording material characteristics by the second detector 72 on only the recording material S that is conveyed last in which an abnormality is detected.

After the second detector 72 detects the recording material characteristics of the recording material S in step S205, or after conveying the recording material S to the second conveyor 52A in step S215, the display controller 98 displays, on the operation display 220 of the image forming device 200, at least one or more pieces of information including the recording material characteristics of the recording material S detected by the first detector 71, the recording material characteristics of the recording material S detected by the second detector 72, and the recording material characteristics determined to be abnormal by the detection result determiner 99 (step S218). With this display, the image forming system 20 notifies the user and the like of the recording material characteristics of the recording material S and the like. For example, the display controller 98 acquires, from the detection controller 96, the recording material characteristics such as the type of the recording material S acquired by using the first detector 71, and outputs the recording material characteristics to the operation display 220. The display controller 98 acquires, from the detection controller 96, the detailed recording material characteristics such as the type and physical properties of the recording material S acquired by using the second detector 72, and outputs the recording material characteristics to the operation display 220. Furthermore, the display controller 98 acquires the determination result of the recording material characteristics of the recording material S from the detection result determiner 99 and outputs the information on the recording material characteristics in which an abnormality is detected in the recording material S to the operation display 220. Note that this process can be performed in any order with the process of step S219 and step S220 to be described later. Therefore, this process may be performed after the process of step S219 and step S220 or at the same time as the process of step S219 and step S220.

Next, the conveyance controller 95 causes the recording material S conveyed by the second conveyor 52A of the image forming device 200A to pass through the joiner 59, further switches the conveyance route at the branch 354 in the post-processing device 300A, and conveys the recording material S from the second conveyor 52A to the fourth conveyor 353 (step S219).

Then, the conveyance controller 95 discharges the recording material S conveyed by the fourth conveyor 353 from the first discharger 355 (step S220). By discharging the recording material S from the first discharger 355, the conveyance controller 95 discharges the recording material S on which no image has been formed from the image forming system 20.

After discharging the recording material S from the first discharger 355 or the second discharger 351, the process according to this flowchart is finished.

In the process according to the flowchart described above, the recording material S in which the second detector 72 detects the recording material characteristics (first sheet or first recording material S) is conveyed from the first conveyor 51A of the recording material conveyance device 500 to the second conveyor 52A that bypasses the image former 240 of the image forming device 200A. Then, in the second conveyor 52A, the second detector 72 detects the recording material characteristics. Furthermore, the recording material S in which the second detector 72 detects the recording material characteristics is not conveyed to the image former 240, but is discharged from the first discharger 355 of the post-processing device 300A.

The image forming system 20 conveys the next recording material S to be conveyed following the first recording material S (second sheet or second recording material S) to the first conveyor 51A, and the first detector 71 detects the recording material characteristics. Then, the image forming system 20 determines whether there is an abnormality in the recording material characteristics of the recording material S detected by the first detector 71, and conveys only the recording material S in which no abnormality is detected to the third conveyor 53A that passes through the image former 240 of the image forming device 200A. Then, the image former 240 can form an image on the second recording material S.

If the first detector 71 detects an abnormality in the recording material characteristics, the image forming system 20 conveys the second recording material to the second conveyor 52A of the image forming device 200A. At this time, if the recording material S of which the second detector 72 is detecting the recording material characteristics (first recording material) stays in the second conveyor 52A, the image forming system 20 stops the detection of the recording material characteristics of the staying first recording material S by the second detector 72. Then, the first recording material S is conveyed to the fourth conveyor 353 of the post-processing device 300A and discharged from the first discharger 355. This makes the conveyance route of the second conveyor 52A empty and ready to convey the next recording material S (second recording material S). As a result, the image forming system 20 can convey, to the second conveyor 52A, the second recording material S in which the first detector 71 detects an abnormality in the recording material characteristics.

In this way, by promptly conveying the second recording material S in which the first detector 71 detects an abnormality in the recording material characteristics to the second conveyor 52A, the image forming system 20 can convey the next recording material S (third sheet or third recording material S) from the recording material feeding device 100 to the first conveyor 51A.

Therefore, in the second conveyor 52A, if an abnormality is detected in the recording material characteristics of the succeeding second recording material S while the detector is detecting the recording material characteristics of the preceding first recording material S, it is not necessary to stop the conveyance of the recording material S. This allows the image forming system 20 to suppress a decrease in productivity of the image forming device.

Note that the present invention is not limited to the configuration described in the above embodiments, and various modifications and changes can be made without departing from the configuration of the present invention.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE NUMERALS

10, 20 . . . image forming system
50, 250 . . . conveyor
51, 51A . . . first conveyor
52, 52A . . . second conveyor
53, 53A . . . third conveyor
54 . . . conveyance roller
55 . . . delivery inlet
56, 355 . . . first discharger
57 . . . export outlet
58, 354 . . . branch
59 . . . joiner
70 . . . recording material feeder
71 . . . first detector
72 . . . second detector
80 . . . image processer
81 . . . storage
82 . . . communicator
90 . . . controller
91 . . . CPU
92 . . . ROM
93 . . . RAM
94 . . . paper feed controller
95 . . . conveyance controller
96 . . . detection controller
97 . . . image forming controller
98 . . . display controller
99 . . . detection result determiner
100 . . . recording material feeding device
200, 200A . . . image forming device
220 . . . operation display
230 . . . scanner
240 . . . image former
241Y, 241M, 241C, 241K . . . photoreceptor drum
242Y, 242M, 242C, 242K . . . electrifier
243Y, 243M, 243C, 243K . . . exposer
244Y, 244M, 244C, 244K . . . developer
245Y, 245M, 245C, 245K . . . primary transfer roller
246 . . . intermediate transfer belt
247 . . . secondary transfer roller
248 . . . fixer
300, 300A . . . post-processing device
350 . . . fifth conveyor
351 . . . second discharger
352, 356 . . . paper output tray
353 . . . fourth conveyor
400, 500 . . . recording material conveyance device

The invention claimed is:

1. A recording material conveyance device comprising:

a first conveyor that constitutes a conveyance route for a recording material;

a second conveyor and a third conveyor that branch off from the first conveyor and constitute the conveyance route for the recording material on a downstream side of a recording material conveyance direction of the first conveyor;

a first detector that detects recording material characteristics of the recording material disposed in the first conveyor;

a second detector that detects the recording material characteristics disposed in the second conveyor; and a controller that stops the detection by the second detector and discharges the recording material that is being detected by the second detector when the first detector detects an abnormality in a detection result of the recording material characteristics.

2. The recording material conveyance device according to claim 1, wherein when the first detector detects the abnormality in the detection result of the recording material characteristics, the controller conveys the recording material in which the abnormality is detected to the second conveyor and discharges the recording material.

3. The recording material conveyance device according to claim 1, wherein when the first detector detects the abnormality in the detection result of the recording material characteristics, the controller discharges, from the second conveyor, the recording material in which the recording material characteristics are detected by the second detector and the recording material in which the abnormality is detected by the first detector.

4. The recording material conveyance device according to claim 1, wherein while the second detector is detecting the recording material characteristics, the controller stops the conveyance of the recording material by the second conveyor or makes a conveyance speed of the recording material by the second conveyor lower than a conveyance speed by the first conveyor.

5. The recording material conveyance device according to claim 1, further comprising:

a first discharger from which the recording material conveyed by the second conveyor is discharged; and a second discharger from which the recording material conveyed by the third conveyor is discharged.

6. The recording material conveyance device according to claim 1, wherein while the second detector is detecting the recording material characteristics of a first recording material in the second conveyor, the controller causes the first detector to detect the recording material characteristics of a second recording material that is conveyed following the first recording material in the first conveyor.

7. The recording material conveyance device according to claim 6, wherein when the first detector detects the abnormality in the detection result of the recording material characteristics of the second recording material, the controller conveys the second recording material to the second conveyor and causes the second detector to detect the recording material characteristics of the second recording material.

8. The recording material conveyance device according to claim 7, wherein when the first detector detects the abnormality in the detection result of the recording material characteristics of a plurality of the second recording materials, the controller causes the second detector to detect the recording material characteristics of the second recording materials.

9. The recording material conveyance device according to claim 7, wherein when the second detector detects the abnormality in the detection result of the recording material characteristics of the second recording material, the controller notifies information on the second recording material.

10. The recording material conveyance device according to claim 1, wherein when the first detector detects no abnormality in the detection result of the recording material characteristics, the controller conveys the recording material to the third conveyor.

11. The recording material conveyance device according to claim 1, wherein the second conveyor includes a conveyance route that allows the recording material to be conveyed without going through an image former; and the third conveyor includes a conveyance route to convey the recording material through the image former.

12. An image forming system including an image former that forms an image on a recording material, the image forming system comprising:

a first conveyor that constitutes a conveyance route for the recording material;

a second conveyor and a third conveyor that branch off from the first conveyor and constitute the conveyance route for the recording material on a downstream side of a recording material conveyance direction of the first conveyor;

a first detector that detects recording material characteristics of the recording material disposed in the second conveyor;

a second detector that detects the recording material characteristics disposed in the first conveyor; and a controller that stops the detection by the second detector and discharges the recording material that is being detected by the second detector when the first detector detects an abnormality in a detection result of the recording material characteristics.

13. The image forming system according to claim 12, wherein when the first detector detects no abnormality in the detection result of the recording material characteristics, the controller conveys the recording material in which the first detector detects the recording material characteristics from the third conveyor to the image former.

14. The image forming system according to claim 12, further comprising:

a first discharger from which the recording material conveyed by the second conveyor is discharged; and a second discharger from which the recording material conveyed by the third conveyor is discharged.

15. The image forming system according to claim 14, wherein the second conveyor constitutes the conveyance route that discharges the recording material from the first discharger without passing through the image former.

16. The image forming system according to claim 14, wherein the third conveyor constitutes the conveyance route in which the recording material discharged from the first discharger passes through the image former.

17. The image forming system according to claim 14, further comprising a joiner in which the second conveyor and the third conveyor join on a downstream side of a conveyance direction of the recording material of the image former, wherein the second conveyor is connected to the first discharger on the downstream side of the conveyance direction of the recording material of the joiner.

18. The image forming system according to claim 17, further comprising:

a fourth conveyor and a fifth conveyor that branch off from the second conveyor on the downstream side of the conveyance direction of the recording material of the joiner, and constitute the conveyance route for the recording material on a downstream side of the recording material conveyance direction of the second conveyor; and the second discharger that is connected to the fifth conveyor and discharges the recording material.

19. The image forming system according to claim 18, wherein the controller discharges the recording material conveyed by the second conveyor from the first discharger via the fourth conveyor, and discharges the recording material that is conveyed by the third conveyor and passes through the image former from the second discharger via the fifth conveyor.

* * * * *